US012704818B2

(12) United States Patent
Matsue et al.

(10) Patent No.: US 12,704,818 B2
(45) Date of Patent: Aug. 11, 2026

(54) ELECTRONIC DEVICE AND ELECTRONIC TIMEPIECE

(71) Applicant: CASIO COMPUTER CO., LTD., Tokyo (JP)

(72) Inventors: Takeshi Matsue, Tokyo (JP); Nobuharu Aso, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 284 days.

(21) Appl. No.: 18/523,113

(22) Filed: Nov. 29, 2023

(65) Prior Publication Data

US 2024/0176308 A1 May 30, 2024

(30) Foreign Application Priority Data

Nov. 30, 2022 (JP) ................................ 2022-191317

(51) Int. Cl.
*G04R 60/10* (2013.01)
*G04R 60/14* (2013.01)

(52) U.S. Cl.
CPC ............ *G04R 60/10* (2013.01); *G04R 60/14* (2013.01)

(58) Field of Classification Search
None
See application file for complete search history.

(56) References Cited

U.S. PATENT DOCUMENTS

2016/0344096 A1* 11/2016 Erentok ................ G04G 21/04
2020/0057413 A1 2/2020 Yamamoto
2020/0319605 A1* 10/2020 Watanabe ............. G04R 20/02

FOREIGN PATENT DOCUMENTS

EP 1099722 A2 * 5/2001 ........... C08J 7/0427
JP 2006-112866 A 4/2006
JP 2007-013862 A 1/2007
JP 2007-526985 A 9/2007
JP 2008076325 A * 4/2008
JP 2008-241396 A 10/2008
JP 2015-179929 A 10/2015

OTHER PUBLICATIONS

Priority document retrieval failure notice for JP 2022-191317 (Year: 2025).*
JPO; Application No. 2022-191317; Notice of Reasons for Refusal dated Mar. 11, 2025.
EPO; Application No. 23211560.0; Extended European Search Report dated Apr. 19, 2024.

* cited by examiner

*Primary Examiner* — Renee S Luebke
*Assistant Examiner* — Michael James Walker
(74) *Attorney, Agent, or Firm* — Fitch, Even, Tabin & Flannery LLP

(57) ABSTRACT

An electronic device includes a case, an antenna element and a first conductor. The case has a space inside and includes an insulating material. The antenna element is disposed in the case and includes an antenna pattern. The antenna pattern includes at least a part extending substantially parallel to a first axis direction perpendicular to a central axis of the case. The first conductor is disposed between the case and the antenna element, has a surface substantially parallel to a second axis direction along the central axis of the case, and is electrically connected to a ground plane for the antenna element.

14 Claims, 5 Drawing Sheets

ELECTRONIC DEVICE AND ELECTRONIC TIMEPIECE

REFERENCE TO RELATED APPLICATIONS

This application is based upon and claims the benefit of priority from the prior Japanese Patent Application No. 2022-191317, filed on Nov. 30, 2022, the entire content of which is incorporated herein by reference.

TECHNICAL FIELD

The present disclosure relates to an electronic device and an electronic timepiece.

DESCRIPTION OF RELATED ART

There is disclosed, for example, in JP 2008-241396 A, a technique of arranging, in a portable electronic device, an antenna for communicating with the outside. In order to avoid attenuation of radio waves (electromagnetic waves) by electronic components or the like in an electronic device, various efforts have been made in arrangement of an antenna therein.

SUMMARY OF THE INVENTION

According to an aspect of the present disclosure, there is provided an electronic device including:

- a case having a space inside and including an insulating material;
- an antenna element disposed in the case and including an antenna pattern including at least a part extending substantially parallel to a first axis direction perpendicular to a central axis of the case; and
- a first conductor disposed between the case and the antenna element, having a surface substantially parallel to a second axis direction along the central axis of the case, and electrically connected to a ground plane for the antenna element.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, an embodiment(s) will be described with reference to the drawings.

Figure 1:
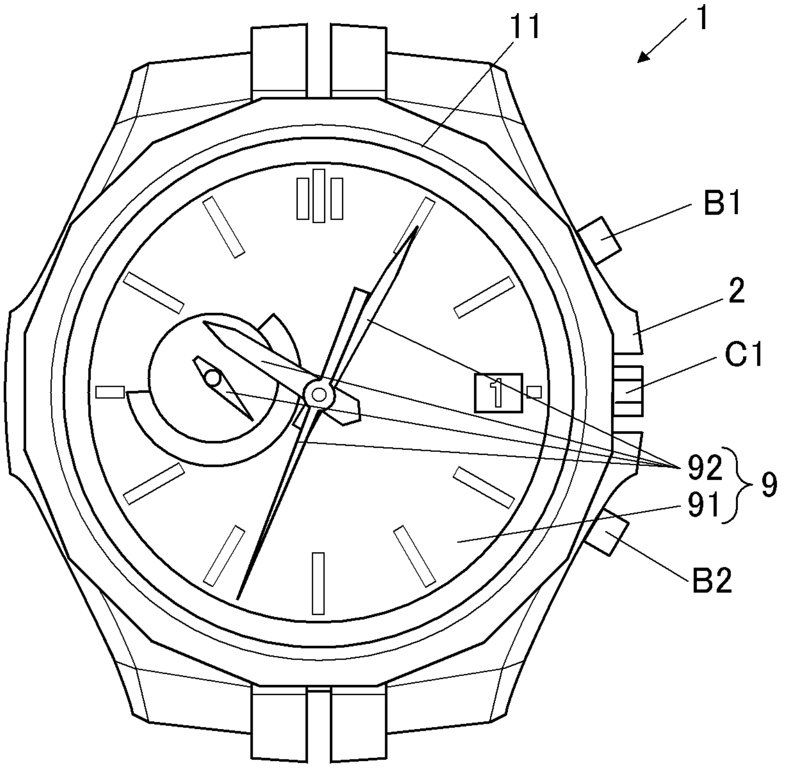
FIG. 1 is a plan view of an electronic device.

FIG. 1 is a plan view of an electronic device 1.

The electronic device 1 is, for example, a wristwatch-type electronic timepiece (electronic wristwatch). The electronic device 1 includes a tube-shaped case 2 with its upper side and lower side (±Z directions) opened by having a substantially cylindrical cavity (internal space), a display 9 including a dial 91 and hands 92, an operation receiver including pushbutton switches B1, B2 and a crown Cl, and a bezel 11 disposed along the upper periphery of the dial 91. The display 9 is disposed in the case 2, and its upper surface is covered with a not-shown transparent crystal. A substrate 3 (shown in FIG. 2A) is disposed under (−Z side) the display 9 in the case 2 of the electronic device 1. The bottom of the electronic device 1 is sealed with a not-shown back cover. In this embodiment, the display 9 is an analog display where the hands 92 rotate above the dial 91, but not limited thereto. The display 9 may be a digital display having a digital display screen, such as a liquid crystal display. In the case of a digital display screen, usually, the twelve o'clock direction in analog display (analog presentation) is the upward direction in terms of display (upper end side of letters, etc.), and the three o'clock-nine o'clock direction in analog display is the right-left direction in terms of display (arrangement direction of horizontally written letters), but the actual directions for display may be different therefrom. The case 2 is made of, for example, a composite material including an insulating material, such as carbon fiber-reinforced resin.

FIG. 2A, FIG. 2B, FIG. 3A and FIG. 3B show a positional relationship between components relevant to transmission and reception (which hereinafter may be referred to as "transmission/reception") of radio waves.

Figure 2A:
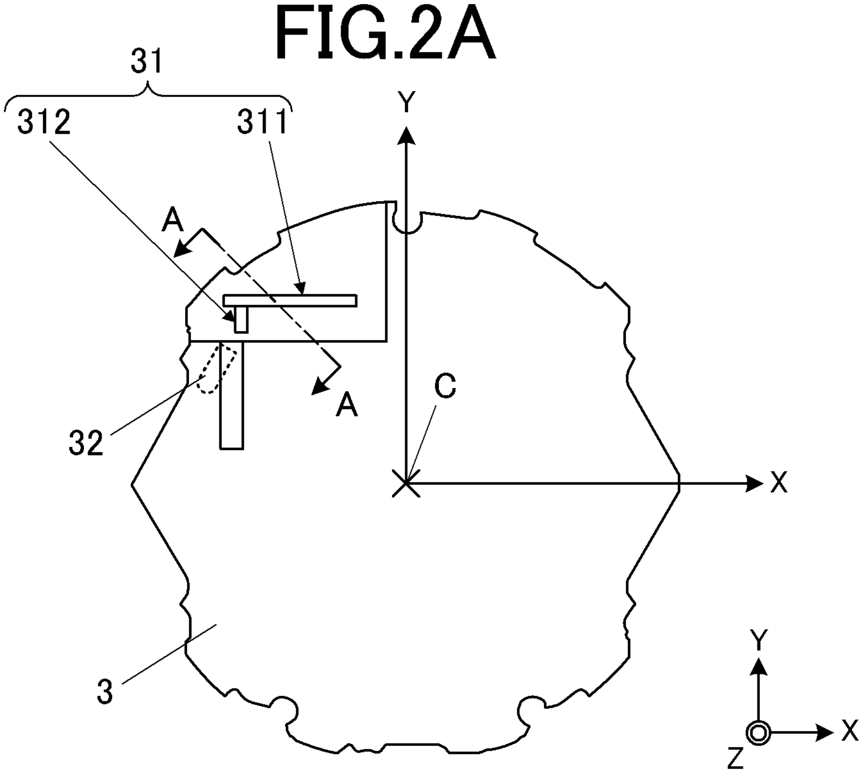
FIG. 2A is an illustration to explain a positional relationship between components relevant to transmission/reception of radio waves, showing the front side of a substrate.
Figure 2B:
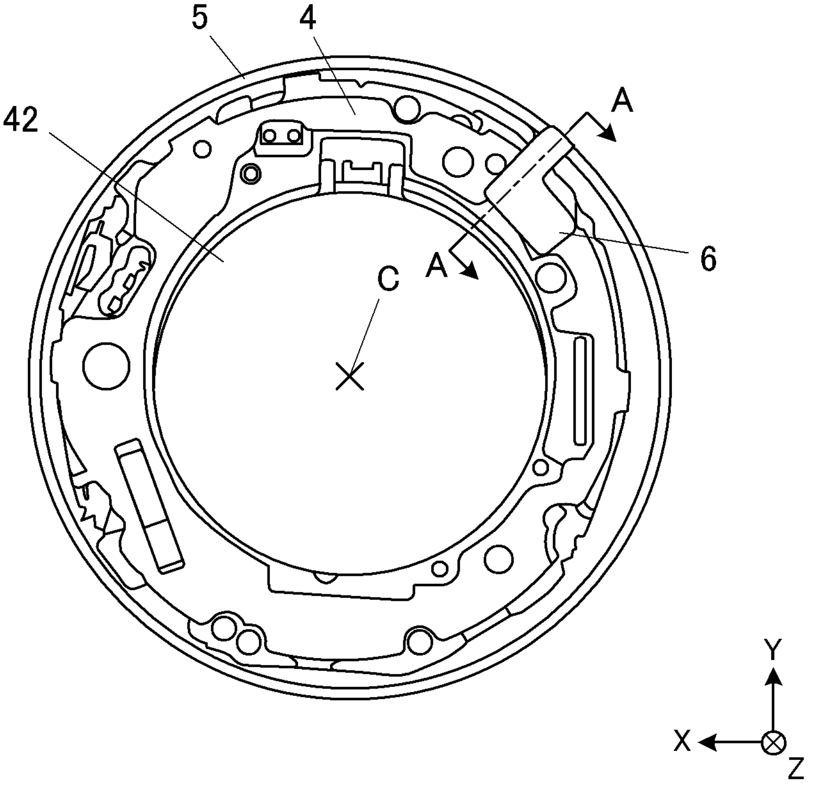
FIG. 2B is an illustration to explain the positional relationship between the components relevant to transmission/reception of radio waves, showing the inside of a case from the back side.
Figure 3A:
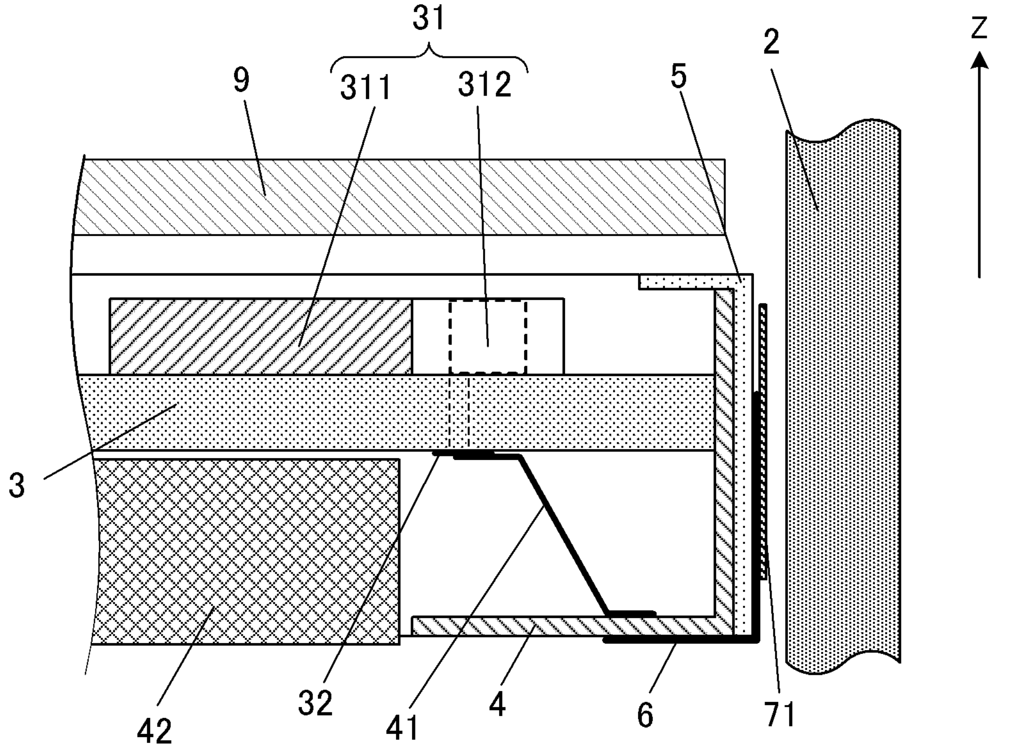
FIG. 3A is a sectional view to explain the positional relationship between the components relevant to transmission/reception of radio waves.

FIG. 2A shows the upper surface of the substrate 3 (display surface side or +Z side). FIG. 2B shows the back-surface side of the substrate 3 together with a pressing member 4 and a casing frame 5 (casing). FIG. 3A is a sectional view of the electronic device 1 taken along line A-A shown in FIG. 2A and FIG. 2B. In FIG. 3A, components irrelevant to the present disclosure are not shown. The sizes, aspect ratios and so forth of the components shown in FIG. 3A may be different from the actual ones.

The substrate 3 has an electronic component(s) and an electronic circuit(s) that control operation of the display 9. The substrate 3 may be a substrate formed of layers stacked. The substrate 3 is disposed under (−Z side) the display 9 in the case 2, and is connected to the display 9 so that a not-shown controller disposed on the substrate 3 controls display contents of the display 9.

On the upper surface (+Z side) of the substrate 3, an antenna element 31 is disposed for wireless communication with external devices. The wireless communication is not particularly limited, but is Bluetooth® in this embodiment. The antenna element 31 for transmitting and receiving radio waves of Bluetooth (e.g., 2.4 GHz band) is a grounded monopole antenna in this embodiment.

The antenna element 31 is fixed, for example, at a position in the eleven o'clock direction, in short, at eleven o'clock, near the front-surface-side periphery of the substrate 3. Hereafter, N o'clock direction indicates N o'clock direction (from the central axis C) when the display surface of the electronic device 1 is viewed in plan view from the +Z side. The antenna element 31 includes an antenna pattern 311 (antenna pattern element) that transmits and receives radio waves and an antenna chip 312 having an electronic component(s) that makes the length of the antenna pattern 311 match the transmission/reception frequency.

The antenna pattern 311 corresponds to the length of about λ/8 of radio waves of the transmission/reception frequency for Bluetooth (2.40 GHz to 2.48 GHz). That is, the antenna pattern 311 may not correspond to the length of the exact λ/8 depending on the configuration of the antenna chip 312 or the like. In this embodiment, the antenna pattern 311 is disposed at eleven o'clock (toward twelve o'clock, e.g., partly or entirely disposed in an area of 45 degrees or less from the Y axis counterclockwise on the central axis C) on the substrate 3. The antenna pattern 311 extends parallel to the substrate 3 (perpendicular to the central axis C that passes through the cavity of the case 2) along the three o'clock-nine o'clock direction (X-axis direction; right-left direction in terms of display on the display surface of the display 9, wherein in this embodiment, +X direction (rightward direction) is a first axis direction). Hence, the antenna pattern 311 has sensitivity mainly in the up-down direction of the electronic device 1 (Z-axis direction; front-back direction or direction perpendicular to the display surface, wherein in this embodiment, +Z direction is a second axis direction) and in the twelve o'clock-six o'clock direction (Y-axis direction; up-down direction in terms of display on the display surface of the display 9 or direction perpendicular to the first axis direction and the second axis direction, wherein in this embodiment, upward direction is a third axis direction). The antenna chip 312 is connected to one end of the antenna pattern 311 and the ground plane on the substrate 3. The antenna element 31, which is composed of the antenna pattern 311 and the antenna chip 312, is L-shaped in plan view, but not limited thereto.

The ground plane passes through the substrate 3 near a connection position of the ground plane and the antenna chip 312 by using a through-hole conductor, a via conductor or the like. If the substrate 3 is a substrate formed of layers stacked, a via conductor divided into multiple stages passes through the substrate 3 as a whole. The ground plane on the back surface of the substrate 3 includes a contact pad 32. The contact pad 32 may be disposed near the through-hole conductor or the via conductor or directly connected to the through-hole conductor or the via conductor.

The substrate 3 together with a battery compartment 42 is fixed by the pressing member 4. The pressing member 4 is mainly made of a conductive (metal) member and connected to the ground plane on the substrate 3, thereby being included in the case ground plane. The pressing member 4 has rigidity the degree of which is appropriate to fix the substrate 3. As shown in FIG. 3A, the pressing member 4 is disposed from the back-surface-side periphery of the substrate 3 to the lateral surface thereof. The pressing member 4 may have gaps and cuts in accordance with its positional relationship with various other components or the like. As shown in FIG. 2B, the battery compartment 42 is disposed at the back-surface-side center of the pressing member 4.

The contact pad 32 is in contact with a connector 41 of the pressing member 4. The connector 41 is, for example, a plate spring that protrudes obliquely from the pressing member 4, and steadily pressed against the contact pad 32 on the substrate 3. Hence, near the antenna pattern 311, the ground plane leads to the pressing member 4.

The casing frame 5 houses the substrate 3 and the pressing member 4, which fixes the substrate 3, and is disposed in the case 2. As shown in FIG. 3A, the casing frame 5 is tube-shaped, cylindrical in this embodiment, and contains the substrate 3 and the pressing member 4 so as to cover the front-surface-side periphery thereof. The casing frame 5 is made of an insulating member, resin or the like in this embodiment, but may be made of a glass material or the like. The casing frame 5 may be less rigid than the pressing member 4. For example, the casing frame 5 may be somewhat distorted by protruding parts of the substrate 3, the pressing member 4 and so forth. The casing frame 5 is of a size not to rattle in the cavity of the case 2.

As described above, the display 9 is disposed above (+Z side) the casing frame 5 as well as the substrate 3 and the pressing member 4, which are contained by the casing frame 5. As shown in FIG. 1, the display 9 that performs analog display has the dial 91 as the display surface and the hands 92 that rotate above the dial 91. The display 9 also has a driver for driving these components, which are relevant to display. Operation of the driver is controlled by the not-shown controller on the substrate 3. The contents displayed by the display 9 include time.

As shown in FIG. 2B and FIG. 3A, the pressing member 4 is in contact with a conductive connecting member 6. The conductive connecting member 6 is not particularly limited, but may be a flexible, bendable in particular, aluminum member (e.g., aluminum foil), for example. The conductive connecting member 6 is led from the back-surface side to the outer side (outer lateral surface) of the casing frame 5 across an edge of the casing frame 5. The battery compartment 42, which houses a battery, is disposed at the center of the pressing member 4 in the bottom view.

Along the outer lateral surface of the casing frame 5 (or the inner lateral surface of the case 2), a conductive sheet 71 (first conductor) is disposed. The conductive sheet 71 extends perpendicular to the substrate 3, namely, in the direction along the central axis C of the case 2, namely, the direction parallel to the second axis. The conductive sheet 71 is disposed at a position in an angular direction that is close to the direction from the central axis C to the position where the antenna pattern 311 is disposed. For example, the conductive sheet 71 is disposed in an area of about 45 degrees, preferably about 30 degrees, from the Y axis (third axis) counterclockwise in rotation on the central axis C in a plane perpendicular to the central axis C. It is especially preferable that the conductive sheet 71 be disposed so as to spread locally, for example, in an area of about 30 degrees with the direction where the antenna pattern 311 is disposed, the eleven o'clock direction in this embodiment, as the center (center line) of the area. That is, the antenna pattern 311 is disposed between the conductive sheet 71 and the central axis C. The conductive sheet 71 may be, for example, aluminum tape, and directly attached to the casing frame 5. Alternatively, the conductive sheet 71 may be attached to the outer lateral surface of the casing frame 5 via an adhesive member. The adhesive member may be, for example, adhesive tape. To the conductive sheet 71, the end of the conductive connecting member 6 on the side to which the conductive connecting member 6 is led is connected. That is, the conductive sheet 71 is electrically connected to the ground plane for the antenna pattern 311 of the antenna element 31. Hence, the ground plane has a width along the extending direction of the antenna pattern 311 (X direction) and also extends perpendicularly/vertically (Z direction).

Ideally, the sensitivity distribution of the antenna element 31 spreads in the shape of a torus around the extending direction of the antenna pattern 311 as its axis. Hence, as described above, the antenna element 31 has sensitivity in the front and back directions (Z-axis direction) perpendicular to the substrate 3 and in the six o'clock and twelve o'clock directions (Y-axis direction). However, in practice, the sensitivity distribution varies some by being affected by various internal components and the case 2, and accordingly the sensitivity as a whole decreases.

To deal with this problem, the electronic device 1 includes, as the ground plane connected to the antenna pattern 311 as a monopole antenna, the conductive sheet 71 that extends perpendicular to the extending direction of the antenna pattern 311 (first axis direction) and substantially parallel to the central axis direction of the case 2 (Z-axis direction or second axis direction). That is, the conductive sheet 71 is arranged such that the central axis C is disposed on at least one of lines passing through the surface of the conductive sheet 71 and being perpendicular to the surface thereof. This enhances the antenna's transmission/reception sensitivity of the electronic device 1 in the five to six o'clock direction and the eleven to twelve o'clock direction in particular. The surface of the conductive sheet 71 may not be flat. The conductive sheet 71 may be somewhat curved along the inner lateral surface of the case 2 or the outer lateral surface of the casing frame 5, or may be somewhat twisted or wavy. The surface of the conductive sheet 71 having a difference(s) of such a degree from being flat is within the range of "a surface substantially parallel to a second axis direction along the central axis of the case" by the difference (s) being averaged.

Figure 3B:
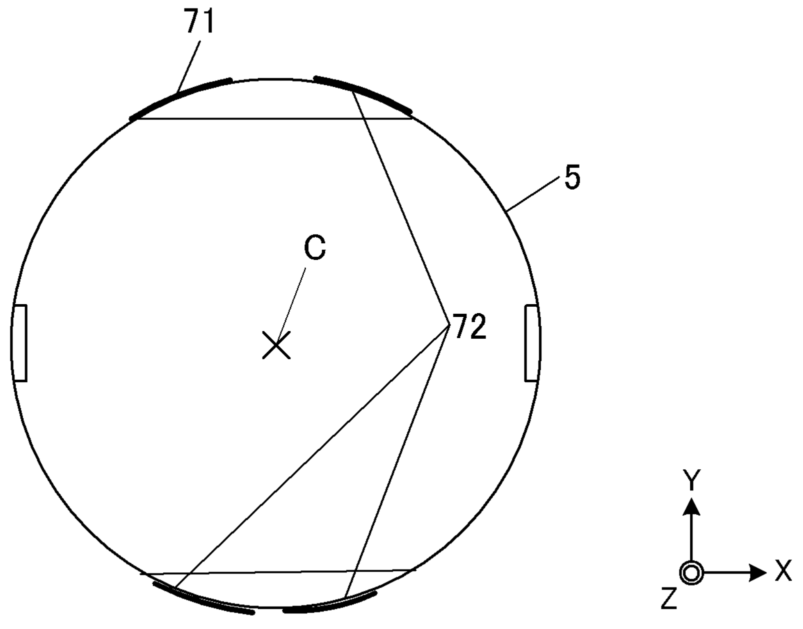
FIG. 3B is an illustration to explain a positional relationship between conductive sheets.

Further, as shown in FIG. 3B, in the plan view of the casing frame 5 from the above (+Z side), conductive sheets 72 (second conductor(s)) are disposed in the electronic device 1 so as to respectively include a point in the one o'clock direction, a point in the five o'clock direction and a point in the seven o'clock direction, the points being on the outer lateral surface of the casing frame 5. The point in the five o'clock direction in this embodiment is a first position, and is a position that is line-symmetric (point-symmetric in plan view) to the center position of the conductive sheet 71 about the central axis C. The point in the one o'clock direction in this embodiment is a second position, and is a position that is substantially plane-symmetric (line-symmetric in plan view) to the center position of the conductive sheet 71 about a plane extending from the central axis C in the twelve o'clock direction (plane of Y=0). The point in the seven o'clock direction in this embodiment is a third position, and is a position that is line-symmetric (point-symmetric in plan view) to the second position about the central axis C. The conductive sheets 72 are not electrically connected to another conductive member, such as the ground plane, and are in a floating state. The conductive sheets 72 are disposed, in plan view, on a circular ring with the central axis C as its center. The surfaces of the conductive sheets 72 close to the center of the electronic device 1 are substantially parallel to the central axis C. The conductive sheets 72 may be somewhat curved along the inner lateral surface of the case 2 or the outer lateral surface of the casing frame 5, or may be somewhat twisted or wavy. That is, each of the conductive sheets 72 is arranged such that the central axis C is disposed on at least one of lines passing through the surface of the conductive sheet 72 and being perpendicular to the surface thereof. The conductive sheets 72 may not be disposed so as to be exactly line-symmetric or point-symmetric to one another or to the conductive sheet 71 in plan view. As far as the conductive sheets 72 are disposed in areas including the first position, the second position and the third position as references, respectively, their positions, orientations, sizes, shapes and so forth may be adjusted as appropriate in accordance with, for example, their positional relationship with other components.

The conductive sheets 72 selectively disposed at such positions function as reflective plates of radio waves. This expands the beamwidth(s) in the six o'clock and twelve o'clock directions (Y-axis direction) relevant to transmission/reception of radio waves. That is, appropriate adjustment of the position of the antenna pattern 311 and the positions of the conductive sheets 71, 72 can expand the beamwidth in a desired direction(s). Hence, in the electronic device 1 of this embodiment, transmission/reception of radio waves in the twelve o'clock direction of the electronic device 1 can be more stable.

The conductive sheet 72 at five o'clock and the conductive sheet 72 at seven o'clock may be connected to be a single sheet. This single conductive sheet may spread to have the area of two conductive sheets 72 in total, namely, to have the size of about one conductive sheet 72 toward five o'clock and the size of about one conductive sheet 72 toward seven o'clock with six o'clock as the center.

Figure 4A:
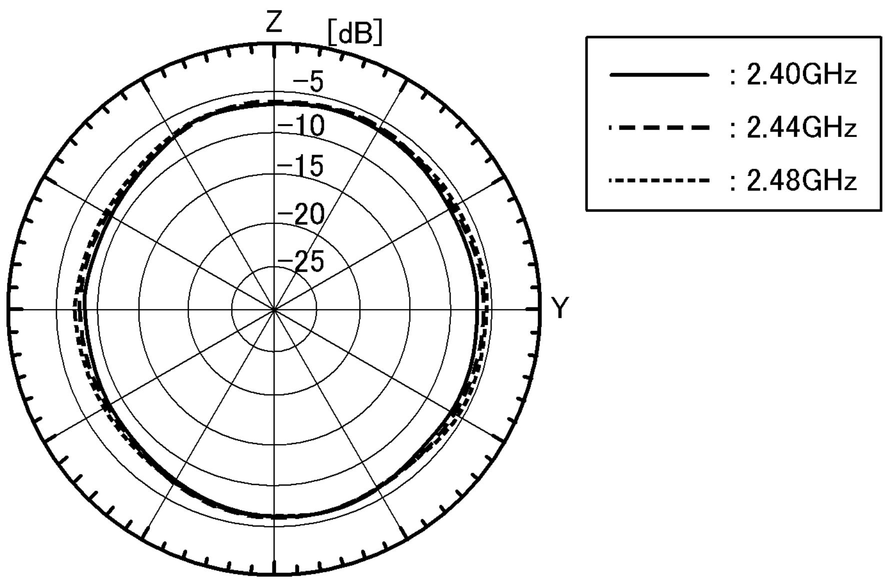
FIG. 4A shows results obtained by numerical calculation about gain distribution.
Figure 4B:
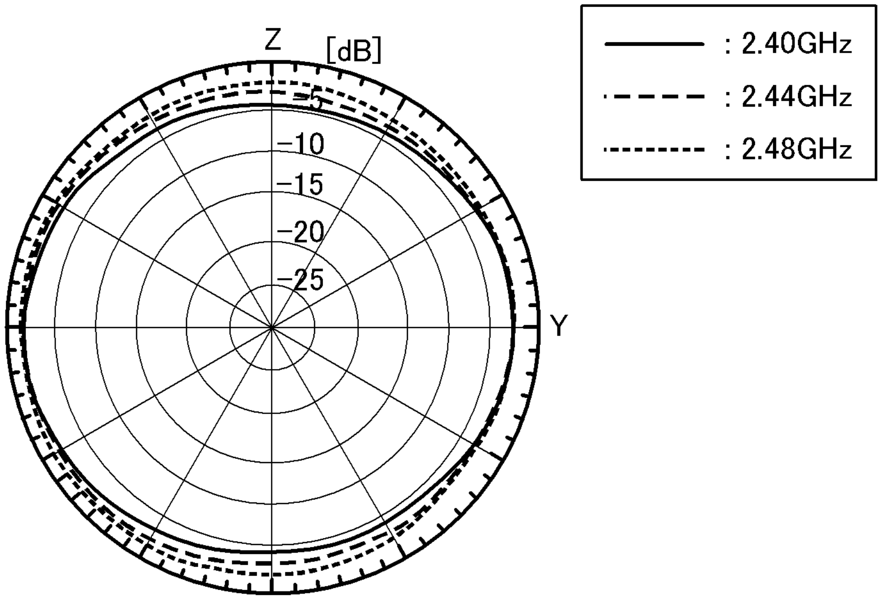
FIG. 4B shows results obtained by the numerical calculation about the gain distribution.

FIG. 4A and FIG. 4B show results obtained by numerical calculation about gain distribution in a plane including the six o'clock and twelve o'clock directions and the axial direction of the case 2 in a case where the conductive sheets 71, 72 are not provided and in a case where the conductive sheets 71, 72 are provided, respectively. Three lines in each of FIG. 4A and FIG. 4B indicate the reception sensitivity (radiant gain) at 2.40 GHz, 2.44 GHz and 2.48 GHz, which are within the band of radio waves to be transmitted and received using Bluetooth.

Compared with the case shown in FIG. 4A, where the conductive sheets 71, 72 are not provided, in the case shown in FIG. 4B, where the conductive sheets 71, 72 are provided, the reception sensitivity is better in almost all the directions. FIG. 4B shows an increase of about 2 dB in the reception sensitivity (radiant gain) as compared with FIG. 4A.

Figure 5A:
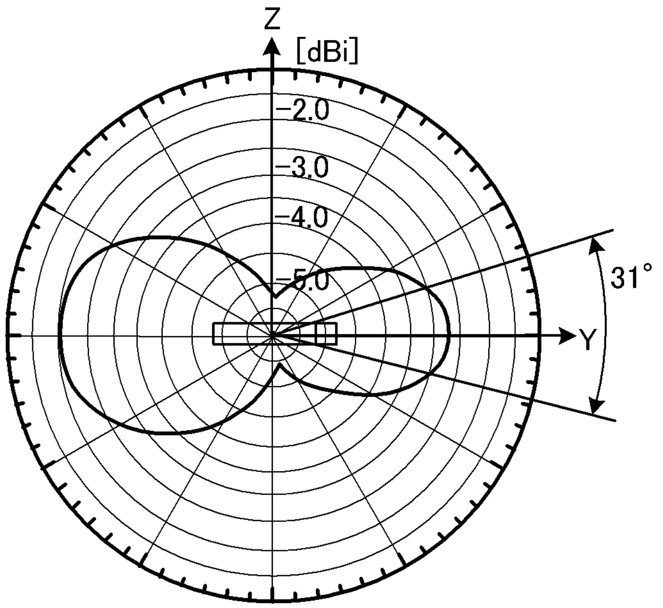
FIG. 5A shows examples of results obtained by numerical calculation about beam pattern.
Figure 5B:
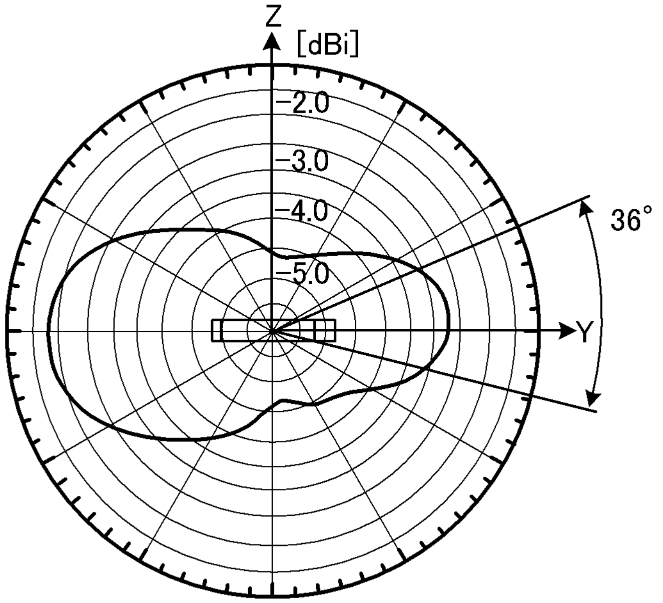
FIG. 5B shows examples of results obtained by the numerical calculation about the beam pattern.

FIG. 5A and FIG. 5B show examples of results obtained by numerical calculation about beam pattern in the plane including the six o'clock and twelve o'clock directions and the axial direction of the case 2. FIG. 5A shows an example of the results in a case where the conductive sheet 71 is provided but the conductive sheets 72 are not provided. FIG. 5B shows an example of the results in a case where the conductive sheets 71, 72 are provided. FIG. 5A and FIG. 5B both show the results obtained by the calculation in a case of emission of 2.40 GHz radio waves.

Compared with the case shown in FIG. 5A, where the conductive sheets 72 are not provided, in the case shown in FIG. 5B, where the conductive sheets 72 are provided, the beamwidth at −3 dBi expands (about 5 degrees) in the twelve o'clock direction (Y-axis direction; upward direction in terms of display) in particular. When the electronic device 1, which is an electronic timepiece, communicates with an external device in the state of being worn on a wrist of a user, the external device is often located in the twelve o'clock direction of the electronic device 1. In particular, when the user of the electronic device 1 searches for the external device by making use of Bluetooth (Find Me function, which causes an external device with which the electronic device 1 performs communication connection by Bluetooth to perform a predetermined notifying action), the user often moves closer to the external device with the twelve o'clock direction of the electronic device 1 facing the external device, following a notifying action by the external device, with which the electronic device 1 has established communication. In such a case, the expansion of the beamwidth in the twelve o'clock direction enables the electronic device 1 to maintain communication connection with the external device, thereby not losing the external device, and to easily find the external device.

As described above, the electronic device 1 of this embodiment includes: the case 2 having a space inside and including an insulating material (resin); the antenna element 31 disposed in the case 2 and including the antenna pattern 311 including at least a part extending substantially parallel to the first axis direction perpendicular to the central axis C of the case 2; and the conductive sheet 71 disposed between the case 2 and the antenna element 31, having a surface substantially parallel to the second axis direction along the central axis C, and electrically connected to the ground plane for the antenna element 31. Thus, the electronic device 1 has the conductive sheet 71 having the surface extending parallel to the central axis C and electrically connected to the ground plane near the antenna pattern 311, the ground plane where the current pattern of the antenna pattern 311 as a monopole antenna is projected. This conductive sheet 71 can appropriately enhance the transmission/reception sensitivity to radio waves in the plane parallel to the substrate 3 (and the display screen) of the electronic device 1 in particular.

Further, the conductive sheet 71 is arranged such that the antenna pattern 311 is disposed at least in part on at least one of the lines passing through the surface (conductive surface) of the conductive sheet 71 and being perpendicular to the surface thereof. This positional relationship between the sheet surface and the antenna pattern 311 can enhance the transmission/reception sensitivity of the electronic device 1 more efficiently.

Further, the conductive sheet 71 may be disposed at least in part in an area of 45 degrees or less from the twelve o'clock direction (third axis direction) in rotation on the central axis C of the case 2 in plan view viewed along the central axis C (second axis direction). The conductive sheet 71 disposed at a position in the direction where the transmission/reception sensitivity to radio waves in the electronic device 1 tends to decrease a little as compared with the original sensitivity of the antenna element 31 can compensate for the transmission/reception sensitivity easily and appropriately. Thanks to the conductive sheet 71, the ground plane spreads in the immediate vicinity of the antenna pattern 311 in particular. Thus, the conductive sheet 71 can appropriately and favorably affect transmission/reception of radio waves by the antenna pattern 311.

Further, the electronic device 1 includes the display 9 having a display surface. The first axis direction, which is relevant to the extending direction of the antenna pattern 311, is the leftward direction or the rightward direction in terms of display on the display surface. The third axis direction is the upward direction in terms of display on the display surface. Enhancement of the sensitivity of the antenna element 31 in the upward direction in plan view in terms of the display direction by/on the display 9 enables the electronic device 1 to more stably communicate with an external device located across the display surface.

Further, the antenna pattern 311 is disposed in the area of 45 degrees or less from the third axis direction in rotation on the central axis C in the plane perpendicular to the central axis C, namely, in the plane parallel to the first axis and the third axis. The antenna pattern 311 itself is disposed near the conductive sheet 71. Hence, the electronic device 1 can more effectively use the conductive sheet 71 as the ground plane when transmitting and receiving radio waves.

Further, the electronic device 1 may include the conductive sheet(s) 72 not electrically connected to the ground plane and disposed in an area including at least one of: the first position (at five o'clock) that is point-symmetric to the conductive sheet 71 (at eleven o'clock) in plan view about the central axis C of the case 2; the second position (at one o'clock) that is line-symmetric to the conductive sheet 71 in plan view about the plane (straight line in plan view) including the central axis C and extending in the third axis direction; and the third position (at seven o'clock) that is line-symmetric to the first position in plan view about the plane (straight line in plan view) including the central axis C and extending in the third axis direction. This conductive sheet(s) 72 appropriately functions as a reflective plate(s) of radio waves, and, as compared with the conventional technique, can expand the beamwidth in the radio wave transmission/reception direction (twelve o'clock direction) parallel to the display surface of the electronic device 1. Hence, the reception sensitivity to radio waves (and the transmission intensity of radio waves) of the electronic device 1 hardly drops even if the attitude of the electronic device 1 somewhat changes, for example, by the user moving while holding the electronic device 1, which can reduce the possibility of communication disconnection or the like of the electronic device 1 in the state in which the user is moving with the electronic device 1 worn or held.

Further, the electronic device 1 includes the substrate 3 disposed in the case 2 and the insulating casing frame 5 that houses the substrate 3. The conductive sheet 71 is disposed between the casing frame 5 and the case 2. Thus, the conductive sheet 71 is disposed in a gap that is generated perpendicular to the central axis C, so that the electronic device 1 can stably keep the thin conductive sheet 71 inserted therein.

Further, the case 2 is made of fiber-reinforced resin (carbon fiber-reinforced resin in this embodiment) as a main component. Fiber-reinforced resin (e.g., carbon fiber-reinforced resin) is prone to cause dielectric loss owing to its base material, namely, resin, and may reduce the reception sensitivity to radio waves (and the transmission intensity of radio waves) of the antenna pattern 311, which is disposed in the case 2, by behaving as if it absorbs radio waves. The configuration/structure of this embodiment, however, can enhance the reception sensitivity of the electronic device 1 in almost all the directions, and also expand the beamwidth in a desired direction(s).

In this embodiment, the electronic device 1 is an electronic timepiece including the display 9 capable of displaying time.

According to this electronic timepiece, a portable timepiece, such as a wristwatch, can perform communication more stably even in the state of being worn on a wrist or the like.

The present disclosure is not limited to the above embodiment, and can be modified in a variety of respects. For example, in the above embodiment, the antenna pattern 311 is perfectly straight, but may be somewhat curved. For example, the antenna pattern 311 may be bent to be L-shaped, thereby partly extending in a different direction. Alternatively, the entire antenna pattern 311 may be slightly (e.g., about 30 degrees or less) curved, thereby facing a certain direction on average. Such an antenna pattern 311 is also within the range of "an antenna pattern including at least a part extending substantially parallel to a first axis direction perpendicular to a central axis of the case", wherein the certain direction is the first axis direction.

Further, the antenna pattern 311 (first axis direction) may not extend along the X-axis direction (three o'clock-nine o'clock direction). That is, the antenna pattern 311 may extend along another direction in the plane substantially perpendicular to the direction along the central axis C (Z-axis direction or second axis direction). This "substantially perpendicular" allows some inclination (45 degrees or less, often about 15 degrees or less) toward the Z-axis direction. The inclination to be allowed may be determined by taking influence of, for example, shapes of other components and the case 2 on radio waves into account.

Further, the first axis direction may be oriented so as to correspond to either end of the antenna pattern 311. That is, the nine o'clock direction (−X direction or leftward direction in terms of display) may be determined as the first axis direction. Further, the first, second and third axes (axis directions) may be determined in either the left-handed system or the right-handed system.

Further, in the above embodiment, the case 2 is made of carbon fiber-reinforced resin as a main component, but not limited thereto. The case 2 may be made of another kind of fiber-reinforced resin as a main component. According to the present disclosure, the transmission/reception sensitivity to radio waves, in the horizontal plane (XY plane) in particular, can be enhanced even with the case 2 made of resin as a main component.

Further, the course of the ground plane, to which the antenna pattern 311 is connected, to the conductive sheet 71 (ground plane) is not limited to the one described in the above embodiment. For example, the upper surface (ground plane) of the substrate 3 may be connected directly to the pressing member 4 (ground plane). Alternatively, the contact pad 32 (ground plane) on the substrate 3 may be connected directly to the conductive connecting member 6 (ground plane), not via the pressing member 4.

Further, the electronic device 1 may not include the casing frame 5 described in the above embodiment. In this case, the conductive sheet 71 may be fixed directly to the inner lateral surface of the case 2. Alternatively, the conductive sheet 71 may not be fixed to the case 2 or the casing frame 5 if there is no risk that the conductive sheet 71 becomes out of shape or position significantly.

Further, in the above embodiment, the antenna pattern 311 and the conductive sheet 71 are disposed at eleven o'clock of the electronic device 1, but not limited thereto. For example, the antenna pattern 311 and the conductive sheet 71 may be disposed at one o'clock thereof. In this case, the conductive sheet 71 may be disposed in an area of about 45 degrees, preferably about 30 degrees, from the Y-axis (third axis) clockwise in rotation on the central axis C in the plane perpendicular to the central axis C. Alternatively, the antenna pattern 311 and the conductive sheet 71 may be disposed at a position(s) between two o'clock and four o'clock of the electronic device 1 on the assumption that around three o'clock thereof is used, for example, to search for an external device. In the above cases, the positions of the conductive sheets 72 are changed in accordance with the position of the conductive sheet 71.

Further, in the above embodiment, assuming that an external device as the target of communication (including the Find Me function) is present at twelve o'clock of the electronic device 1, radio wave performance in the twelve o'clock direction in particular has been enhanced, but not limited thereto. Depending on the intended use of radio waves (communication), types of the electronic device 1 and an external device, combination of these and/or the like, the positions of the antenna pattern 311 and the conductive sheets 71, 72 may be determined to enhance radio wave performance in another/other direction(s).

Further, in the above embodiment, the conductive sheets 71, 72 are disposed on the outer lateral surface of the casing frame 5, which is along the inner lateral surface of the case 2, but not limited thereto. The conductive sheets 71, 72 may be disposed at appropriate positions on the inner lateral surface of the casing frame 5.

Further, in the above embodiment, the conductive sheets 71, 72, which are sheet-shaped, are provided as the first and second conductors, but the first and second conductors are not limited thereto. For example, the first and second conductors may each be a conductive member having a thickness in the direction in which the conductive member is connected to the antenna pattern 311, or may each be a conductive member having a three-dimensional structure.

Further, the electronic device 1 may not have all the three conductive sheets 72 but have one or two of these. In this case, the electronic device 1 may have the conductive sheet 72 at one o'clock (second position) preferentially. Alternatively, the electronic device 1 may have no conductive sheet 72.

Further, sections of the case 2 and the casing frame 5 (the inner lateral surface of the case 2 and the outer lateral surface of the casing frame 5) may not be perfectly circular in plan view as far as the positional relationship between the conductive sheets 71, 72, namely, the distance(s) therebetween, direction(s) of their conductive surfaces and so forth, can be maintained appropriately. For example, one or both of the inner lateral surface of the case 2 and the outer lateral surface of the casing frame 5 may be tube-shaped and oval or polygonal in plan view. In the case where one or both of the surfaces is tube-shaped and polygonal in plan view, the central axis C may be set, for example, at the point of intersection of the diagonals of the polygon or at the point of intersection of the perpendicular bisectors from the respective vertexes of the polygon.

Further, examples of the electronic timepiece as the electronic device 1 include a multi-functional electronic timepiece, such as a smartwatch. Further, the electronic device 1 may be an electronic device in which before the function as a timepiece, another function(s) comes, such as a smartphone or a tablet computer. Further, the electronic device 1 may be an electronic device having no display 9. The electronic device 1 may be a remote controller that receives input operations and outputs signals or a sensor device that performs physical measurement and outputs measurement results or the like as signals, for example.

The details of the components, the configuration, the contents and procedure of processing, and so forth described in the above embodiment can be appropriately changed without departing from the scope of the present disclosure. The scope of the present disclosure includes the scope of claims below and their equivalents.

The invention claimed is:

1. An electronic device comprising:

a case having a space inside and including an insulating material;

an antenna element disposed in the case and including an antenna pattern including at least a part extending substantially parallel to a first axis direction perpendicular to a central axis of the case; and a first conductor disposed between the case and the antenna element, having a surface substantially parallel to a second axis direction along the central axis of the case, and electrically connected to a ground plane for the antenna element, wherein the first conductor is arranged such that the antenna pattern is disposed at least in part on at least one of lines passing through the surface and being perpendicular to the surface, wherein the first conductor is arranged such that the central axis is disposed on the at least one of the lines or at least another one of the lines, and wherein the antenna pattern is disposed between the first conductor and the central axis in a plan view viewed along the second axis direction.

2. The electronic device according to claim 1, further comprising a display having a display surface, wherein the first axis direction is a leftward direction or a rightward direction in terms of display on the display surface.

3. The electronic device according to claim 2, wherein the first conductor is disposed at least in part in an area of 45 degrees or less from a third axis direction in rotation on the central axis in a plane perpendicular to the central axis, the third axis direction being perpendicular to the first axis direction and the second axis direction and being an upward direction in terms of display on the display surface.

4. The electronic device according to claim 3, further comprising a second conductor not electrically connected to the ground plane and disposed in an area including at least one of: a first position that is point-symmetric to the first conductor in the plan view about the central axis of the case; a second position that is line-symmetric to the first conductor in the plan view about a plane including the central axis and extending in the third axis direction; and a third position that is line-symmetric to the first position in the plan view about the plane including the central axis and extending in the third axis direction.

5. The electronic device according to claim 4, wherein the second conductor has a surface substantially parallel to the second axis direction, and is arranged such that the central axis is disposed on at least one of lines perpendicular to the surface.

6. An electronic device comprising:

a case having a space inside and including an insulating material;

an antenna element disposed in the case and including an antenna pattern including at least a part extending substantially parallel to a first axis direction perpendicular to a central axis of the case;

a first conductor disposed between the case and the antenna element, having a surface substantially parallel to a second axis direction along the central axis of the case, and electrically connected to a ground plane for the antenna element;

a substrate disposed in the case; and an insulating casing that houses the substrate, wherein the first conductor is disposed between the casing and the case.

7. The electronic device according to claim 1, wherein the case is made of the insulating material that is fiber-reinforced resin as a main component.

8. An electronic timepiece comprising:

a case having a space inside and including an insulating material;

an antenna element disposed in the case and including an antenna pattern including at least a part extending substantially parallel to a first axis direction perpendicular to a central axis of the case; and a first conductor disposed between the case and the antenna element, having a surface substantially parallel to a second axis direction along the central axis of the case, and electrically connected to a ground plane for the antenna element, wherein the first conductor is arranged such that the antenna pattern is disposed at least in part on at least one of lines passing through the surface and being perpendicular to the surface, wherein the first conductor is arranged such that the central axis is disposed on the at least one of the lines or at least another one of the lines, and wherein the antenna pattern is disposed between the first conductor and the central axis in a plan view viewed along the second axis direction.

9. The electronic timepiece according to claim 8, further comprising a display having a display surface where time is displayable, wherein the first axis direction is a leftward direction or a rightward direction in terms of display on the display surface.

10. The electronic timepiece according to claim 9, wherein the first conductor is disposed at least in part in an area of 45 degrees or less from a third axis direction in rotation on the central axis in a plane perpendicular to the central axis, the third axis direction being perpendicular to the first axis direction and the second axis direction and being an upward direction in terms of display on the display surface.

11. The electronic timepiece according to claim 10, further comprising a second conductor not electrically connected to the ground plane and disposed in an area including at least one of: a first position that is point-symmetric to the first conductor in the plan view about the central axis of the case; a second position that is line-symmetric to the first conductor in the plan view about a plane including the central axis and extending in the third axis direction; and a third position that is line-symmetric to the first position in the plan view about the plane including the central axis and extending in the third axis direction.

12. The electronic timepiece according to claim 11, wherein the second conductor has a surface substantially parallel to the second axis direction, and is arranged such that the central axis is disposed on at least one of lines perpendicular to the surface.

13. An electronic timepiece comprising:

a case having a space inside and including an insulating material;

an antenna element disposed in the case and including an antenna pattern including at least a part extending substantially parallel to a first axis direction perpendicular to a central axis of the case;

a first conductor disposed between the case and the antenna element, having a surface substantially parallel to a second axis direction along the central axis of the case, and electrically connected to a ground plane for the antenna element;

a substrate disposed in the case; and an insulating casing that houses the substrate, wherein the first conductor is disposed between the casing and the case.

14. The electronic timepiece according to claim 8, wherein the case is made of the insulating material that is fiber-reinforced resin as a main component.

* * * * *